(12) United States Patent  (10) Patent No.: US 8,230,344 B2
Abujbara et al.  (45) Date of Patent: Jul. 24, 2012

(54) MULTIMEDIA PRESENTATION CREATION

(75) Inventors: Nabil Mohammed Abujbara, Irvine, CA (US); Richard Kirkor Yardumian, Orange, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 176 days.

(21) Appl. No.: 12/762,130

(22) Filed: Apr. 16, 2010

(65) Prior Publication Data

US 2011/0258548 A1  Oct. 20, 2011

(51) Int. Cl.
 *G06F 3/00* (2006.01)
(52) U.S. Cl. .................... 715/730; 715/706; 715/744
(58) Field of Classification Search ............ 715/706, 715/730, 758, 866, 744
See application file for complete search history.

(56) References Cited

U.S. PATENT DOCUMENTS

| | | | |
|---|---|---|---|
| 6,873,710 B1 | 3/2005 | Cohen-Solal et al. | |
| 7,113,074 B2 | 9/2006 | Gutta et al. | |
| 7,134,130 B1 * | 11/2006 | Thomas | 725/25 |
| 7,298,871 B2 | 11/2007 | Lee et al. | |
| 7,672,439 B2 * | 3/2010 | Appelman et al. | 379/207.16 |
| 2007/0024580 A1 * | 2/2007 | Sands et al. | 345/156 |
| 2007/0172155 A1 | 7/2007 | Guckenberger | |
| 2007/0177805 A1 | 8/2007 | Gallagher | |
| 2007/0256105 A1 | 11/2007 | Tabe | |
| 2007/0277196 A1 | 11/2007 | Steengaard et al. | |
| 2008/0004951 A1 * | 1/2008 | Huang et al. | 705/14 |
| 2008/0059282 A1 | 3/2008 | Vallier et al. | |
| 2008/0195480 A1 * | 8/2008 | Calabria | 705/14 |
| 2008/0205789 A1 | 8/2008 | Ten Kate et al. | |
| 2008/0235574 A1 | 9/2008 | Telek et al. | |
| 2008/0307307 A1 * | 12/2008 | Ciudad et al. | 715/719 |
| 2009/0123035 A1 * | 5/2009 | Khouri et al. | 382/115 |
| 2010/0138037 A1 * | 6/2010 | Adelberg et al. | 700/241 |
| 2011/0257985 A1 * | 10/2011 | Goldstein | 705/1.1 |

OTHER PUBLICATIONS http://www.life-ware.com/.

* cited by examiner

*Primary Examiner* — Omar Abdul-Ali
(74) *Attorney, Agent, or Firm* — Canon U.S.A., Inc., IP Division

(57) ABSTRACT

A method for creating a multimedia presentation, the method including determining the physical presence of at least one individual, selecting at least one multimedia object associated with the at least one individual whose physical presence has been determined, creating a multimedia presentation using the at least one multimedia object associated with the at least one individual, determining the physical presence of additional individuals other than the at least one individual, selecting at least one multimedia object associated with each of the additional individuals whose physical presence has been determined, updating the multimedia presentation using the at least one multimedia object associated with each of the additional individuals, and displaying the multimedia presentation.

18 Claims, 6 Drawing Sheets

| Name | Multimedia Object | Creation Date | Creation Location |
|---|---|---|---|
| John Doe | JoDimage1.jpg | 1/1/10 | Irvine, CA. |
| | JoDimage2.jpg | 1/5/10 | Anaheim, CA. |
| | JoDimage3.jpeg | 1/10/10 | Los Angeles, CA. |
| Jane Doe | JaDsound1.wav | 11/15/09 | |
| | JaDvideo1.mpeg | 12/24/09 | Parent's house |
| | JaDimage1.jpeg | 12/25/09 | Parent's house |
| John Doe/Jane Doe | JoDJaDimage1.jpg | 2/1/10 | Irvine, CA. |
| | JoDJaDimage2.jpg | 2/1/10 | Irvine, CA. |

Figure 5

JoDimage1.jpg
JoDimage2.jpg
JoDimage3.jpeg
JaDsound1.wav
JaDvideo1.mpeg
JaDimage1.jpeg

Figure 6

MULTIMEDIA PRESENTATION CREATION

BACKGROUND OF THE INVENTION

1. Field of the Invention

The present invention relates generally to the generation of multimedia presentations.

2. Description of the Related Art

With the popularity of digital cameras, digital camcorders, etc., users of these devices have wanted to share with others the large number of photos and videos captured by these devices. To share their photos and videos, users are uploading them to their personal computers, media servers on their home networks, Internet-based storage locations, or social networking web sites.

Currently, when a user wishes to display photos or videos containing specific individuals, the user must spend an enormous amount of time locating the desired images by searching through all of the user's photos and videos in all of the various storage locations. Once the desired images have been chosen, the user must then spend time manually putting the images into a single presentation that can then be shared with others.

In light of the above, what is needed is a way for users to easily locate desired images and create a presentation based on the desired images to share with others.

SUMMARY OF THE INVENTION

To solve the aforementioned issue, the present invention provides a method for locating desired images and automatically creating a multimedia presentation based on these images.

According to an aspect of the present invention, a method for creating a multimedia presentation including determining the presence of at least one individual, selecting at least one image associated with the at least one individual whose presence has been determined, creating a multimedia presentation using the at least one image associated with the at least one individual, determining the presence of additional individuals other than the at least one individual, selecting at least one image associated with each of the additional individuals whose presence has been determined, updating the multimedia presentation using the at least one image associated with each of the additional individuals, and displaying the multimedia presentation.

Further aspects and features of the present invention will become apparent from the following description of exemplary embodiments (with reference to the attached drawings).

BRIEF DESCRIPTION OF THE DRAWINGS

FIG. 5 is an example of the structure for storing multimedia files according to an exemplary embodiment.

FIG. 6 is an example of the structure of a multimedia object list according to an exemplary embodiment.

DETAILED DESCRIPTION OF EXEMPLARY EMBODIMENTS

Figure 1:
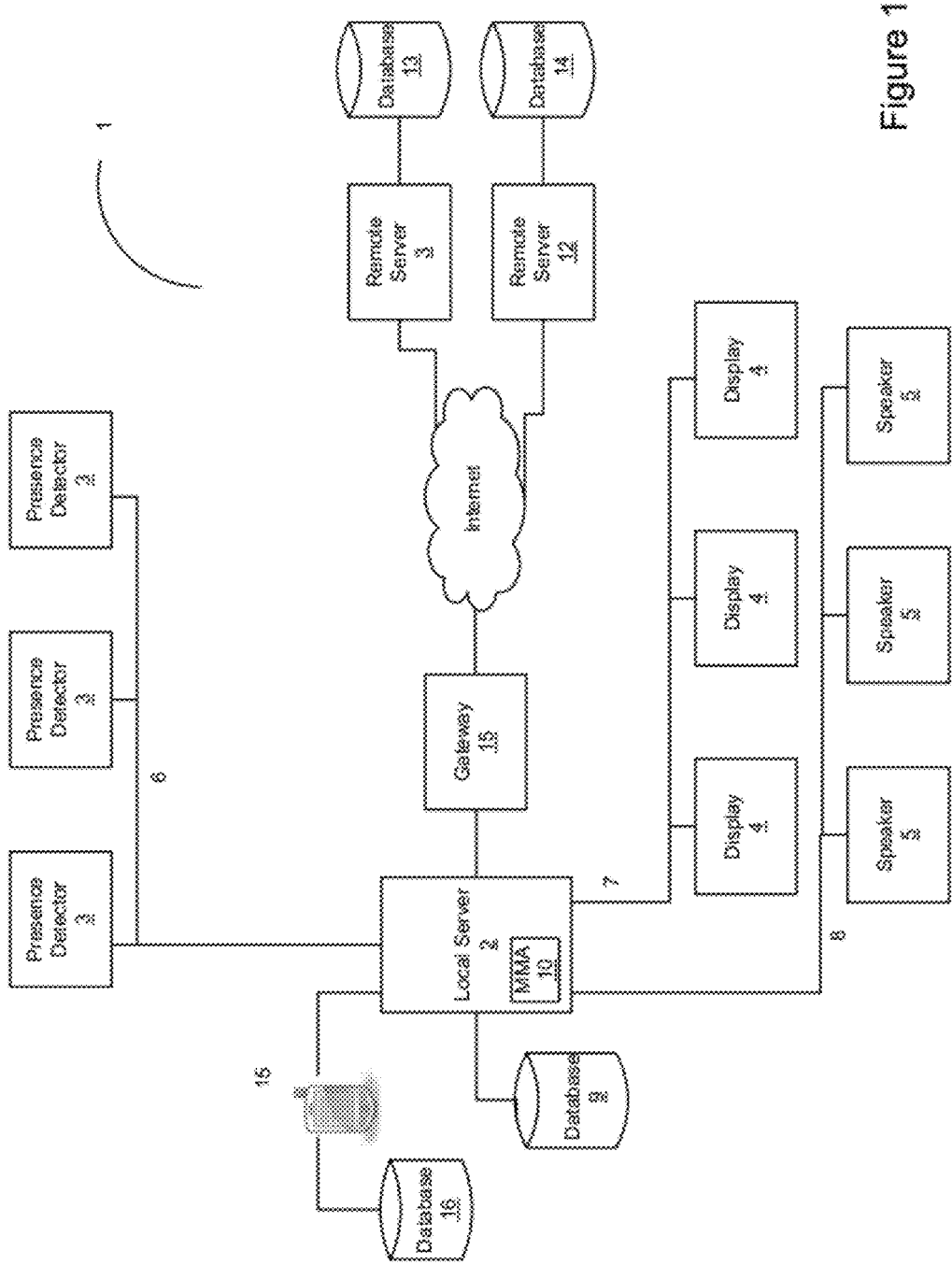
FIG. 1 is a representational view illustrating a general configuration of a multimedia presentation system according to an exemplary embodiment.

FIG. 1 is a representational view illustrating a general configuration of the block diagram illustrating a multimedia presentation system according to an exemplary embodiment of the present invention. Multimedia presentation system 1 includes a local server 2, a remote server 3, a remote server 12, presence detectors 3, displays 4, and speakers 5. Local server 2 and remote servers 3 and 12 are connected via the Internet or any type of communication connection, such as a WLAN. Presence detectors 3 are connected to local server 2 via network interface 6. Displays 4 are connected to local server 2 via network interface 7. Speakers 5 are connected to local server 2 via network interface 8. Network interfaces 6, 7, and 8 can be any type of network interface, such as a wired connection, wireless connection, etc.

Local server 2 is also connected to database 9. Database 9 contains various multimedia objects which include, but are not limited to, still images, videos, music files, sound files, etc. The manner in which these files are stored is described below with respect to FIG. 5. Mobile device 15 can also be connected to local server 2 via any known method for connecting a mobile device to a server. Mobile device 15 can be, but is not limited to, a smartphone, personal data assistant, netbook, notebook, etc. Mobile device 15 is connected to database 16, which, like database 9, contains multimedia objects. Local server 2 contains multimedia application 10. Multimedia application 10 is described in more detail below with respect to FIG. 3.

Figure 2:
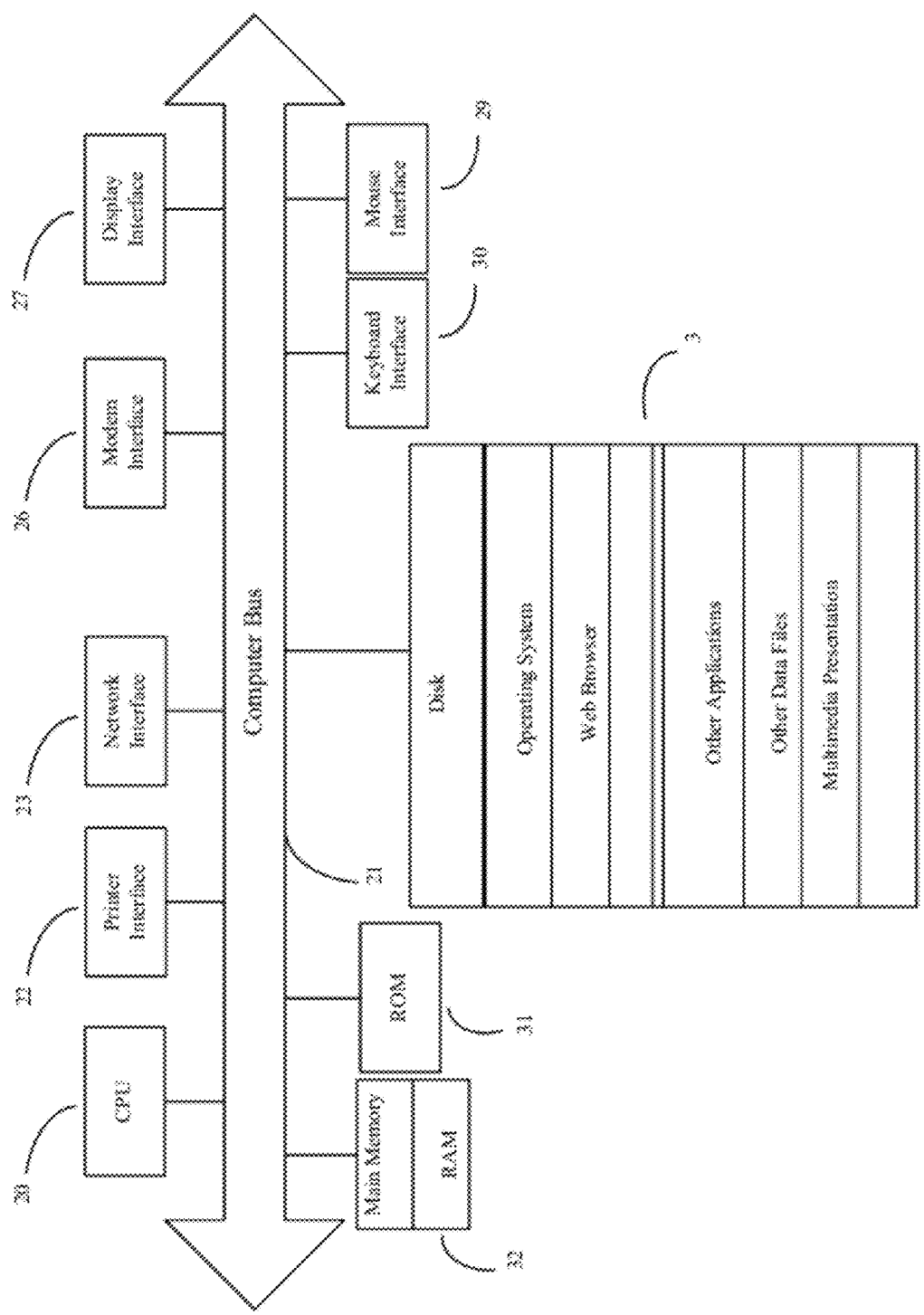
FIG. 2 is a block diagram illustrating an example of the internal architecture of an information processing apparatus implementing the multimedia presentation application according to an exemplary embodiment.

FIG. 2 is a block diagram illustrating an example of the internal architecture of a local server 2. Shown in FIG. 2 is CPU 20, which can be any type of microprocessor, which interfaces to computer bus 21. Also interfacing with computer bus 21 are printer interface 22, allowing the local server 2 to communicate with a local or remote printer (not shown), network interface 23 enabling communication between the local server 2 and a network, modem interface 26 enabling communication between the local server 2 and its internal modem (not shown), display interface 27 for interfacing with a display monitor (not shown), keyboard interface 30 for interfacing with a keyboard (not shown), and mouse interface 29 for interfacing with a mouse (not shown).

Read only memory (ROM) 31 stores invariant computer-executable process steps for basic system functions such as basic I/O, start-up, or reception of keystrokes from a keyboard. Main random access memory (RAM) 32 provides CPU 20 with memory storage that can be accessed quickly.

Also shown in FIG. 2 is disk 3, which includes an operating system, web browser, other applications which may include word processing, spreadsheet, and graphics, and data files. Disk 3 further includes multimedia presentation application 10. In the present embodiment CPU 20 implements multimedia presentation application 10. However, any method for implementing multimedia presentation application 10 that would enable practice of the present invention is applicable.

Figure 3:
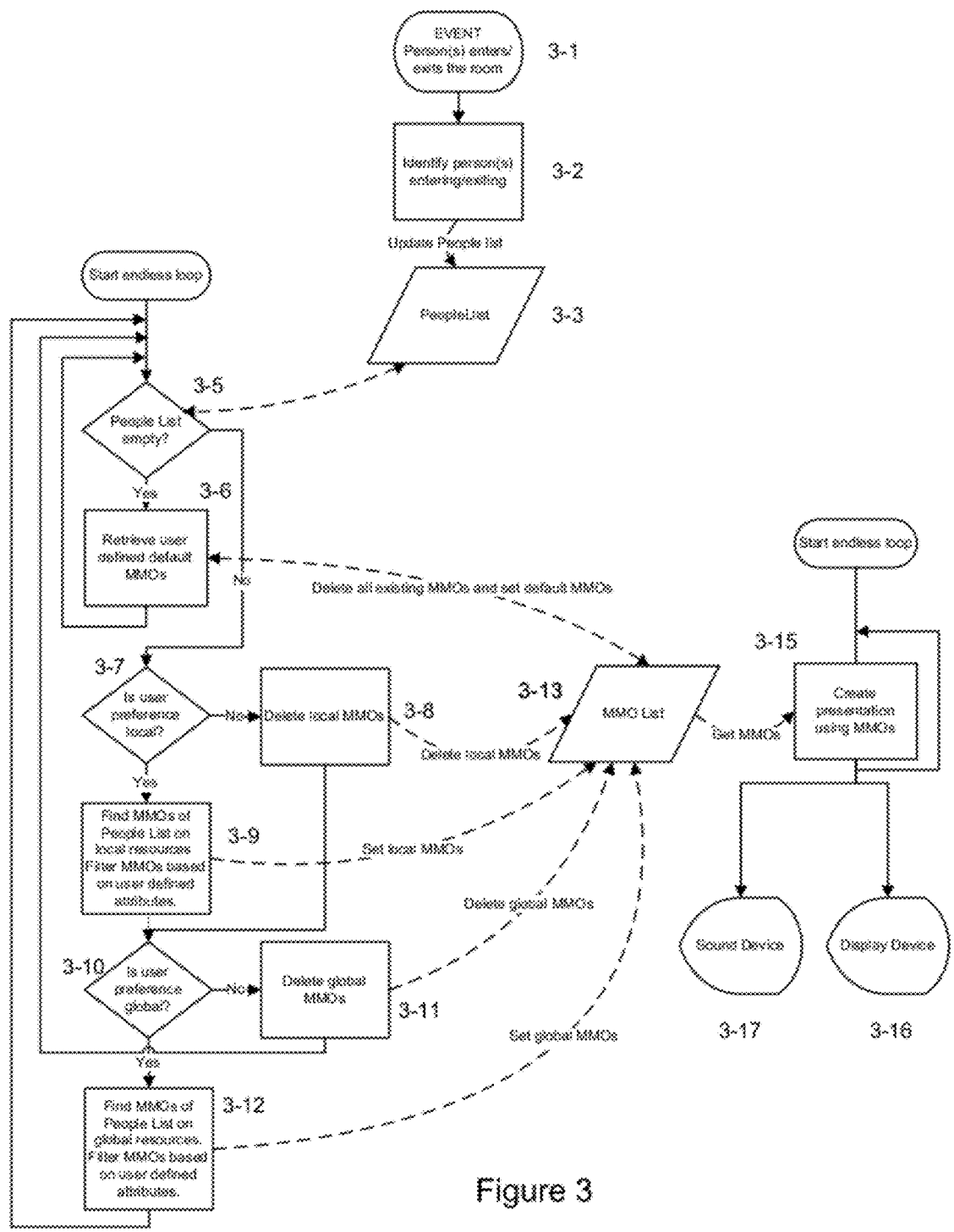
FIG. 3 is a flowchart of a multimedia presentation process according to an exemplary embodiment.

FIG. 3 is a flowchart of multimedia presentation application 10 according to an exemplary embodiment. Briefly, the presence of at least one individual is detected within a predefined area, multimedia files associated with the detected individual(s) are obtained, a multimedia presentation is created using the obtained multimedia files, and the multimedia presentation is displayed.

In more detail, in 3-1, the presence of at least one individual entering or exiting a predefined area is detected by at least one of the presence detectors 3. For description purposes only, the predefined area is a room in a building. However, any area where the presence of an individual can be detected, e.g., in the backyard of a home, the pool area of a hotel, etc., is applicable as the predefined area of the exemplary embodiment.

Upon detection of individuals by the presence detectors 3, the detected individuals are identified in 3-2. Any known means for detecting the presence and/or absence of an individual and identifying individuals, e.g., face recognition, voice recognition, etc., that would enable practice of the present embodiment is applicable, and thus, a detailed description thereof is omitted herein.

In the present embodiment, the physical presence of an individual is detected. In another embodiment, in addition to detecting physical presence, virtual presence can also be detected. For example, in the case of an individual who participates in an event remotely via a web camera, that individual is considered to be virtually present. The application of the multimedia presentation application as described below is applicable whether an individual's physical or virtual presence is detected.

Turning back to FIG. 3, after the detected individuals are identified, people list 3-3 is updated and stored on local server 2, where people list 3-3 contains a list of individuals present in the room at any given time. For example, if an individual enters the room, then people list 3-3 is updated by adding the individual to people list 3-3 to reflect the presence of that individual. In another example, if the same individual later leaves the room, then people list 3-3 is updated by removing the individual to reflect that the individual is no longer present in the room.

While people list 3-3 is stored on local server 2 in the present exemplary embodiment, people list 3-3 can be stored in any location that would enable practice of the present invention. For example, people list 3-3 could be stored on remote server 3, remote server 12, or on any computer connected to local sever 2.

In 3-5, a check is made to determine whether people list 3-3 contains any data, e.g., list of people. This check is conducted continuously at a user-defined interval. If people list 3-3 is empty, then in 3-6, any existing multimedia objects in multimedia object list 3-13 are deleted and replaced with multimedia objects previously selected by the user. Multimedia object list 3-13 contains the multimedia objects that the multimedia presentation application of the present embodiment uses to create a multimedia presentation. FIG. 6 illustrates an example of the contents of multimedia object list 3-13 according to the present embodiment.

In another embodiment, multimedia object list 3-13 does not have to contain the actual multimedia objects, but can contain addresses or pointers to where the actual multimedia objects are stored. When needed, the multimedia objects can be obtained from their storage locations. In still yet another embodiment, multimedia object list 3-13 can contain a combination of actual multimedia objects as well as addresses or pointers to where other multimedia objects are stored.

The multimedia presentation containing the multimedia objects in multimedia objects list 3-13 is created in 3-15, which is described in more detail below. Multimedia objects list 3-13 can be stored on local server 2, remote sever 3, remote server 12, or any other storage medium that would enable practice of the present embodiment.

If in 3-5, it is determined that people list 3-3 is not empty, flow proceeds to 3-7. In 3-7, a determination is made whether a user has indicated that multimedia objects are to be retrieved from at least one local source, e.g., database 9. If it is determined that a local source should not be used, then in 3-8, any local multimedia objects in multimedia object list 3-13 are deleted. Multimedia objects can be determined to be "local" using a variety of known methods, such as storing them in a "local multimedia objects" section of multimedia objects list 3-13.

If it is determined in 3-7 that multimedia objects should be retrieved from at least one local source, flow proceeds to 3-9. In 3-9, multimedia objects associated with individuals in people list 3-3 are retrieved from various sources located in the vicinity of local server 2. These sources can include, but are not limited to, other local servers (not shown), local computers, an individual's mobile device, or any type of storage medium located in the vicinity of remote server 2. After retrieving the multimedia objects, multimedia object list 3-13 is then updated to include the retrieved multimedia objects.

Multimedia objects can be associated with individuals in a variety of means. In the case where a particular multimedia object is a digital image, the multimedia object can be associated with all of the individuals located in the digital image. When the multimedia object is a digital image, another method of associating the multimedia object with particular individuals is by adding an attribute to the multimedia object, e.g., modifying the multimedia's metadata, indicating which individuals deem this multimedia object as a favorite. This method can also be applied where the multimedia object is a sound file. The above-described methods are exemplary methods, and any method for associating a particular multimedia object with particular individuals that would enable practice of the present invention is applicable.

Retrieval of the multimedia objects is based on user-defined attributes. These attributes can include, but are not limited to, the date when a multimedia object was created, where the multimedia object was created, whether a multimedia object is a still image, whether a multimedia object is a video file, or whether an object is a sound file. For example, a user can define that only multimedia objects that were created between Jan. 1, 2010 and Jan. 31, 2010 and are still images be retrieved. Upon retrieval of the multimedia objects, they are used to create a multimedia presentation in 3-15 as discussed below.

FIG. 5 illustrates an example of the structure for storing multimedia objects according to an exemplary embodiment. The structure includes a "Name" field, a "Multimedia Object" field, and attribute fields ("Creation Date, "Creation Location"). The list of names in the "Name" field correspond to the information in people list 3-3. "Multimedia Object" field contains various multimedia objects associated with a particular name. The attribute fields contain information that can be used to determine which multimedia objects to retrieve.

As illustrated in FIG. 5, a multimedia object can be stored such that it is associated with a single individual or it can be stored such that it is associated with multiple individuals. For example, in a case where only a single person appears in an image, e.g., JoDimage1.jpeg, that image is associated only with the name of the individual in the image. On the other hand, in a case where multiple individuals appear in an image, e.g., JoDJaDimage1.jpeg, the image is associated with the names of both individuals appearing in the image.

The information for a particular multimedia object can be populated via a number of methods. For example, a user implementing the present embodiment's multimedia presentation system in the user's home could manually edit the data by adding a particular person and any multimedia objects associated with the person being added that the user has available. The structure is not limited to that illustrated in FIG. 5 and any structure that would enable practice of the present embodiment is applicable.

Next, in 3-10, a determination is made whether a user has indicated that multimedia objects are to be retrieved from at least one global (herein "remote) source, e.g., remote server 3. If it is determined that a remote source should not be used, then in 3-11, any remote multimedia objects in multimedia object list 3-13 are deleted. Multimedia objects can be determined to be "remote" using a variety of known methods, such as storing them in a "remote multimedia objects" section of multimedia objects list 3-13. In another embodiment, the addresses or pointers to the multimedia objects can be determined to be "remote" in the same manner.

If it is determined in 3-10 that multimedia objects should be retrieved from at least one remote source, flow proceeds to 3-12. In 3-12, multimedia objects associated with individuals in people list 3-3 are retrieved from various sources remotely located from local server 2. These sources can include, but are not limited to, other remote servers, e.g., remote server 3, remote computers, a user's mobile device, or any type of storage medium remotely located from local server 2. After retrieving the multimedia objects, multimedia object list 3-13 is then updated to include the retrieved multimedia objects. Retrieval of these multimedia objects is also based on user-defined attributes as described above. In another embodiment, the addresses or pointers to multimedia objects are added to the multimedia object list 3-13.

In 3-15, a multimedia presentation is created using the contents of multimedia object list 3-13. Creation of the multimedia presentation can be done using any well known method, and thus, a detailed description thereof is omitted herein. Examples of a multimedia presentation created in 3-15 include, but are not limited to, a slide show containing images or a slide show containing images and associated music.

In addition to creating the multimedia presentation in 3-15, a user can also define a particular interval in which the multimedia presentation is to be displayed, played, etc. For example, a user can indicate the interval at which a slide show is to be repeated or the interval at which images within the slide show are to be displayed. In another example, if the multimedia presentation consists of just music, the user can indicate how often to repeat a particular song or set of songs.

After the multimedia presentation is created in 3-15, if the multimedia presentation consists of images, for example a slide show, in 3-16, the multimedia presentation is displayed on at least one display device. In one embodiment, display devices are located in the same room as the individuals whose associated images are being displayed. In yet another embodiment, display devices can be located in the same room as the individuals as well as in other locations near where the individuals are located. In still yet another embodiment, the display devices can be located remotely from where the individuals are located, such as on a computer in another city, country, etc. These are just examples of where the multimedia presentation can be displayed, and any location that would enable the multimedia presentation to be displayed would be applicable.

In the case where the multimedia presentation includes sound, or consists solely of sounds, e.g. music, then in 3-17, the sounds are played on sound devices, e.g. speakers. Examples of where the sounds devices can be located are similar to those where the displays can be located.

In another embodiment, if the presence of an individual is detected near a particular display device, then the multimedia presentation displayed on that display device is modified such that the multimedia object associated with the detected individual is repeated within the multimedia presentation at a higher rate than any other multimedia object within the multimedia presentation. If the individual moves to the vicinity of another display device, then display of the multimedia presentation being displayed on the display device located where the individual just left is adjusted to display the multimedia objects associated with this individual at a lower rate. Display of the multimedia presentation on the display device where the individual moves to is then modified as described above.

In still yet another embodiment, a multimedia presentation displaying multimedia objects associated with an individual follows that individual from display to display as the individual moves throughout a room. For example, presume there are two display devices in a room. If an individual is in the vicinity of the first display device, the multimedia presentation displayed on the first display device includes multimedia objects associated with that individual while the multimedia presentation displayed on the second display device does not.

If the individual subsequently leaves the vicinity of the first display device and moves into the vicinity of the second display device, the multimedia presentation on the first display device no longer includes multimedia objects associated with the individual while the multimedia presentation displayed on the second display device begins to display multimedia objects associated with the individual.

In the present embodiment, each time an individual or group of individuals enter the room, people list 3-3 is updated to include the newly detected individual(s). In 3-9 and/or 3-12, when the multimedia objects are retrieved, multimedia objects associated with all the individuals in people list 3-3 are retrieved and set in the multimedia object list 3-13.

In another embodiment, when people list 3-3 is updated to reflect the detection of new individuals, the above-described process includes comparing the previous people list 3-3 with the current people list 3-3 and retrieving only the multimedia objects associated with the newly added individuals. These new multimedia objects are then added to the current set in multimedia object list 3-13 and the multimedia presentation is updated to reflect the newly added multimedia objects.

The process associated with FIG. 3 in the present embodiment describes the situation where at least one individual enters a room. The process of FIG. 3 is also applicable to the situation where at least one individual leaves the room.

In another embodiment, when it is detected in 3-2 that at least one individual has left the room, people list 3-3 is updated by removing the at least one individual to reflect that the at least one individual has left the room. When people list 3-3 is updated to reflect the absence of at least one individual, the above-described process includes comparing the previous people list 3-3 with the current people list 3-3 and then deleting the associated multimedia objects from the current set in multimedia object list 3-13. The multimedia presentation is updated such that it no longer includes multimedia objects associated with the at least one individual who left the room.

When updating the multimedia presentation to reflect the absence of an individual, the multimedia presentation can be updated such that all multimedia objects associated with that individual are removed from multimedia object list 3-13. The multimedia presentation can also be updated such that only multimedia objects associated solely with that individual are removed from multimedia object list 3-13 and any multimedia objects associated with that individual and at least one other individual are not removed. Under the latter, the multimedia objects would not be removed from multimedia object list 3-13 until all the individuals associated with a particular multimedia object are determined to be absent.

For example, as illustrated in FIG. 5, multimedia object "JoDimage1.jpg" is associated solely with John Doe. On the other hand, multimedia object "JoDJaDimage1.jpg" is associated with John Doe and Jane Doe. Per the above embodiment, when John Doe leaves the room, his absence is detected. Upon detection of his absence, in one case, all multimedia objects associated with him, including both "JoDimage1.jpg" and "JoDJaDimage1.jpg" are removed from multimedia object list 3-13 and the multimedia presentation is updated accordingly. In another case, only "JoDimage1.jpeg" is removed from multimedia object list 3-13 since "JoDJaDimage1.jpg" is also associated with Jane Doe.

Figure 4:
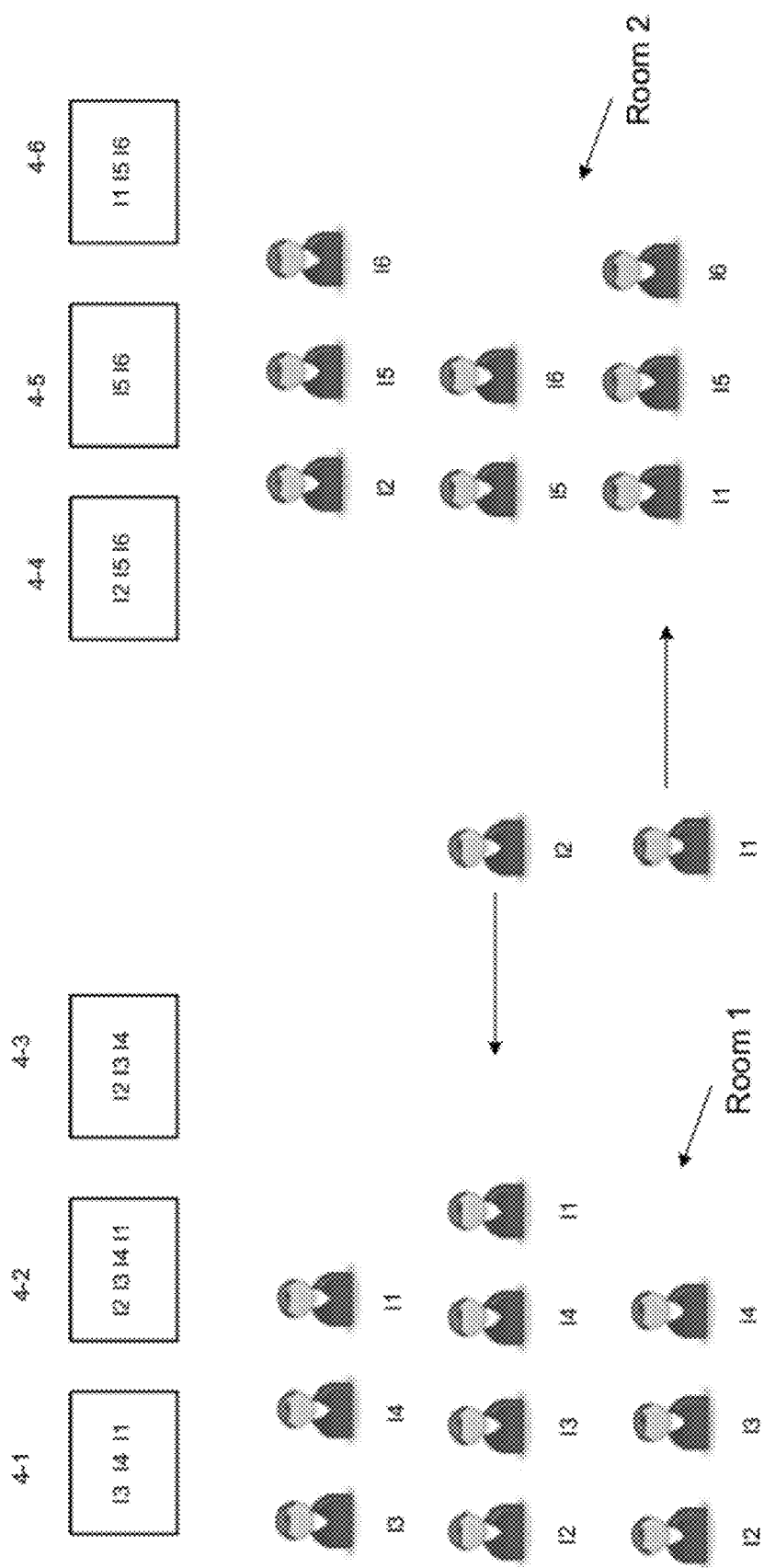
FIG. 4 is a representational view illustrating an example of the multimedia presentation system according to an exemplary embodiment.

The above-described multimedia presentation process will be described with reference to a specific example as illustrated in FIG. 4.

Turning to FIG. 4, individuals I3, I4, and I1 are initially located in Room 1 and their presence is detected by presence detector 3. Based on their detection, multimedia objects associated with each individual is retrieved from a local source, e.g., database 9, a remote source, e.g., database 13, or both. A multimedia presentation using the retrieved multimedia objects is generated and displayed as illustrated in display 4-1. In this case, the retrieved multimedia objects consist of digital images associated with individuals I3, I4, and I1. The digital images could be associated with one of individuals I3, I4, or I1 or could be associated with any combination of individuals I3, I4, or I1.

Individual I2 then enters Room 1. Upon detection of individual I2 by presence detector 3, multimedia objects associated with individual I2 are retrieved. A new multimedia presentation including the multimedia objects associated with individual I2 is generated and displayed as illustrated in display 4-2.

Individual I1 then decides to leave Room 1. Presence detector 3 detects that individual I1 is no longer in Room 1. As a result, the multimedia presentation is updated such that any multimedia objects associated with individual I1 are removed from the presentation. The updated multimedia presentation is then displayed as illustrated in display 4-3. The multimedia presentation can also be updated such that only multimedia objects solely associated with individual I1 are removed from the presentation.

Room 2 illustrates a similar scenario to that described above with respect to Room 1. For Room 2, individuals 15 and 16 remain in the room, while individual I2 who was initially in the room, leaves, and individual I1 enters. Displays 4-4, 4-5, and 4-6 illustrate a multimedia presentation using multimedia objects associated with a particular individual with respect to the individuals in Room 2 at any given time.

It is to be understood that the above described features can be achieved by a method in which a storage medium is supplied to a system or device, the storage medium having computer-executable process steps for realizing the above described functions, and a computer (CPU or MPU) for the system or device that reads the computer-executable process steps stored in the storage medium and executes them.

In this case, the computer-executable process steps read from the storage medium execute the functions of the above described embodiments. Thus, the computer-executable process steps or the storage medium storing the computer-executable process steps therein constitute the present invention.

As a storage medium for supplying the computer-executable process steps, for example, a floppy disk, a hard disk, an optical disk, a magneto-optical disk, a CD-ROM, a CD-R, a magnetic tape, a non-volatile memory card, a ROM, any other applicable computer-readable storage medium can be employed.

When the computer-executable process steps read by the computer are executed, not only are the above described functions of the embodiments realized, but also an operating system working on the computer may carry out part or all of the actual processing that realizes the functions of the above described embodiments.

The computer-executable process steps read from the computer-readable storage medium may be written to a memory provided on a function-extension board inserted into the computer, of a function-extension unit connected to the computer, and a CPU provided on the function-extension board or unit carries out part of all of the actual processing that realizes the functions of the above described embodiments.

While the invention is described above with respect to what is currently its exemplary embodiment, it is to be understood that the invention is not limited to that described above. To the contrary, the invention is intended to cover various modifications and equivalent arrangements within the spirit and scope of the appended claims.

What is claimed is:

1. A method for creating a multimedia presentation, the method comprising:
   determining the physical presence of at least one individual;
   selecting at least one multimedia object associated with the at least one individual whose physical presence has been determined;
   creating a multimedia presentation using the at least one multimedia object associated with the at least one individual;
   determining the physical presence of additional individuals other than the at least one individual;
   selecting at least one multimedia object associated with each of the additional individuals whose physical presence has been determined;
   updating the multimedia presentation using the at least one multimedia object associated with each of the additional individuals; and
   displaying the multimedia presentation,
   wherein a specific location of the at least one individual is determined and the multimedia presentation is displayed on a display near the location of the at least one individual such that the multimedia presentation displayed on the display repeats display of the at least one multimedia object associated with the at least one individual at a higher rate than any other multimedia objects.

2. A method according to claim 1, wherein the at least one multimedia object is a still image.

3. A method according to claim 1, wherein the at least one multimedia object is a video.

4. A method according to claim 1, wherein the at least one multimedia object is a sound file.

5. A method according to claim 4, wherein displaying the multimedia presentation includes playing the sound file.

6. A method according to claim 1, wherein the at least one multimedia object is stored in a location remote from the location where the multimedia presentation is displayed.

7. A method according to claim 1, wherein the at least one multimedia object is stored in a location local to the location where the multimedia presentation is displayed.

8. A method according to claim 1, wherein the at least one multimedia object is provided directly by the at least one individual.

9. A method according to claim 1, wherein detecting the physical presence of the at least one individual includes identifying the at least one individual using facial recognition.

10. A method according to claim 1, wherein detecting the physical presence of the at least one individual includes identifying the at least one individual using voice recognition.

11. A method according to claim 1, wherein when the physical presence of at least one individual is no longer detected, the at least one multimedia object associated with the at least one individual is removed from the multimedia presentation.

12. A method according to claim 1, wherein when the physical presence of the at least one individual is no longer detected and the physical presence of additional individuals is detected, multimedia objects associated with just the at least one individual is removed from the multimedia presentation.

13. A method according to claim 1, wherein the multimedia presentation is displayed on at least one display.

14. A method according to claim 1, wherein user defined attributes are used to filter the at least one multimedia object to be selected.

15. A method according to claim 1, wherein the virtual presence of at least one individual is determined.

16. A method according to claim 15, wherein at least one multimedia object associated with the at least one individual whose virtual presence has been determined is selected and a multimedia presentation is created using the at least one multimedia object.

17. A computer-readable storage medium storing computer-executable process steps for creating a multimedia presentation, the computer-executable process steps comprising:
   determining the physical presence of at least one individual;
   selecting at least one multimedia object associated with the at least one individual whose physical presence has been determined;
   creating a multimedia presentation using the at least one multimedia object associated with the at least one individual;
   determining the physical presence of additional individuals other than the at least one individual;
   selecting at least one multimedia object associated with each of the additional individuals whose physical presence has been determined;
   updating the multimedia presentation using the at least one multimedia object associated with each of the additional individuals; and
   displaying the multimedia presentation,
   wherein a specific location of the at least one individual is determined and the multimedia presentation is displayed on a display near the location of the at least one individual such that the multimedia presentation displayed on the display repeats display of the at least one multimedia object associated with the at least one individual at a higher rate than any other multimedia objects.

18. A system for creating a multimedia presentation, the system comprising:
   an information processing apparatus;
   and at least one display configured to display content from the information processing apparatus,
   wherein the information processing apparatus comprises:
     at least one processor coupled via a bus to a memory, the processor executing computer-executable process steps for:
     determining the physical presence of at least one individual;
     selecting at least one multimedia object associated with the at least one individual whose physical presence has been determined;
     creating a multimedia presentation using the at least one multimedia object associated with the at least one individual;
     determining the physical presence of additional individuals other than the at least one individual;
     selecting at least one multimedia object associated with each of the additional individuals whose physical presence has been determined;
     updating the multimedia presentation using the least one multimedia object associated with each of the additional individuals; and
     displaying the multimedia presentation,
   wherein a specific location of the at least one individual is determined and the multimedia presentation is displayed on a display near the location of the at least one individual such that the multimedia presentation displayed on the display repeats display of the at least one multimedia object associated with the at least one individual at a higher rate than any other multimedia objects.

\* \* \* \* \*